United States Patent [19]

Knapp, Jr.

[11] 4,055,827

[45] Oct. 25, 1977

[54] ELECTRIC FUSE

[75] Inventor: Edward J. Knapp, Jr., Merrimac, Mass.

[73] Assignee: Gould, Inc., Newburyport, Mass.

[21] Appl. No.: 740,402

[22] Filed: Nov. 10, 1976

Related U.S. Application Data

[63] Continuation-in-part of Ser. No. 739,555, Nov. 8, 1976.

[51] Int. Cl.² .......................................... H01H 85/04
[52] U.S. Cl. .................................... 337/297; 337/165; 337/296
[58] Field of Search ............... 337/297, 296, 166, 404, 337/160, 163, 164, 165, 290

[56] References Cited

U.S. PATENT DOCUMENTS

| 2,667,551 | 1/1954 | Berthel | 337/166 |
| 2,683,788 | 7/1954 | Hoorn | 337/166 |
| 2,688,677 | 9/1954 | Laing | 337/165 |
| 2,769,877 | 11/1956 | Sundt | 337/297 |
| 2,864,917 | 12/1958 | Sundt | 337/296 |

Primary Examiner—Harold Broome
Attorney, Agent, or Firm—Erwin Salzer

[57] ABSTRACT

The electric time-lag fuse involves a substantially T-shaped shorting strip shorting the insulating gap formed between a pair of metal overlays on an insulating strip, and a helical tension spring having a variable diameter affixed with one of the ends thereof to said T-shaped shorting strip, and resting with the other end thereof against the annular surface of a tubular member.

4 Claims, 5 Drawing Figures

ELECTRIC FUSE

This is a continuation-in-part of my copending patent application filed Nov. 8, 1976, Ser. No. 739,555 for ELECTRIC TIME-LAG FUSE HAVING A SMALL CURRENT RATING.

While the above application is limited to a time-lag fuse, the present application does not necessarily include such limitation.

BACKGROUND OF THE INVENTION

This invention relates to electric fuses having a relatively small current rating, e.g. 4–20 A. Heretofore the fusible element for such fuses were formed by wires. The use of wires as fusible elements for very low current ratings involves wire bonders and micropositioners and microscopes. It involves also considerable skill of the operator handling such equipment.

The present invention relates to a fuse structure which can be established with relatively simple, printed circuit technology, and does not call for complex microinstrumentation.

SUMMARY OF THE INVENTION

Fuses embodying the present invention include a tubular member of electric insulating material having a predetermined inner diameter. Arranged inside said tubular member is an elongated insulating substrate. The substrate is provided with two metallic overlays leaving a center zone of said substrate uncovered, so as to form an insulating gap therebetween. A bridge member extends across said insulating gap conductively interconnecting portions of said metallic overlays. The bridge member is affixed by a pair of soft solder joints to said metallic overlays. The bridge member is provided with a pair of arms projecting beyond said substrate. A helical extension spring having a relatively small diameter at one end and a relatively large diameter at the other end thereof is arranged in such a way that its small diameter end is affixed to said arms of said bridge member, and rests with its end of relatively large diameter against one of the end surfaces of said tubular member.

DESCRIPTION OF PREFERRED EMBODIMENT

Figure 1:
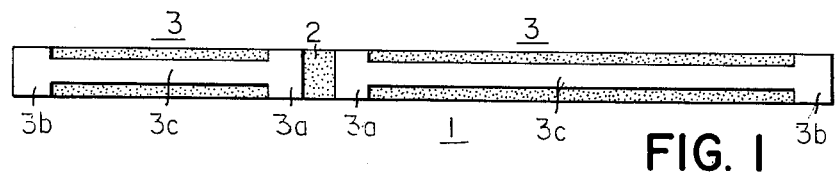
FIG. 1 is a top-plan view of the substrate and of the metallic overlays thereon.
Figure 1A:
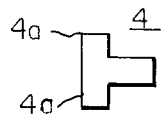
FIG. 1a is a top-plan view of the bridge member.

Referring now to the drawings, reference numeral 1 has been applied to indicate a substrate of electric insulating material. The substrate is initially metal clad and may be formed by a printed circuit board. The center area 2 of strip 1 is entirely bare, i.e. the metal layer which was there is there entirely removed so as to form an insulating gap. The center area 2 does not need to be positioned exactly in the center of substrate 1, but may be arranged somewhere between the end thereof. Two substantially I-shaped overlays 3 formed by metal are arranged to opposite sides of center area 2. Each of overlays 3 has a relatively wide portion 3a immediately adjacent center area 3, an axially outer relatively wide end portion 3b and an intermediate portion 3c which is of relatively limited width. The bridge or shorting member 4 conductively interconnects the two overlay areas 3a. This is achieved by two solder joints 5a, 5b.

Figure 1B:
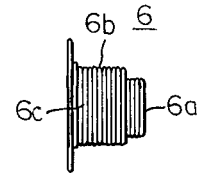
FIG. 1b is a top-plan view of the variable diameter spring.
Figure 2:
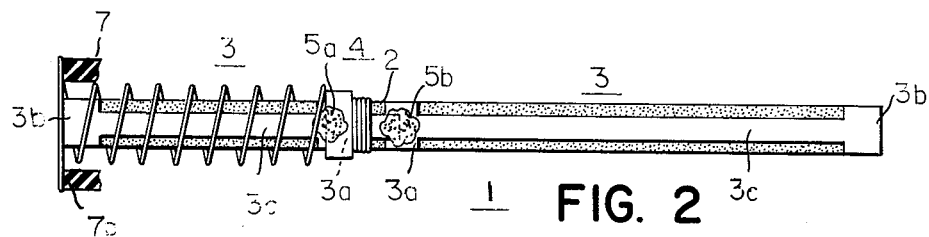
FIG. 2 is a top-plan view showing the assembly of the constituent parts of the fuse.
Figure 3:
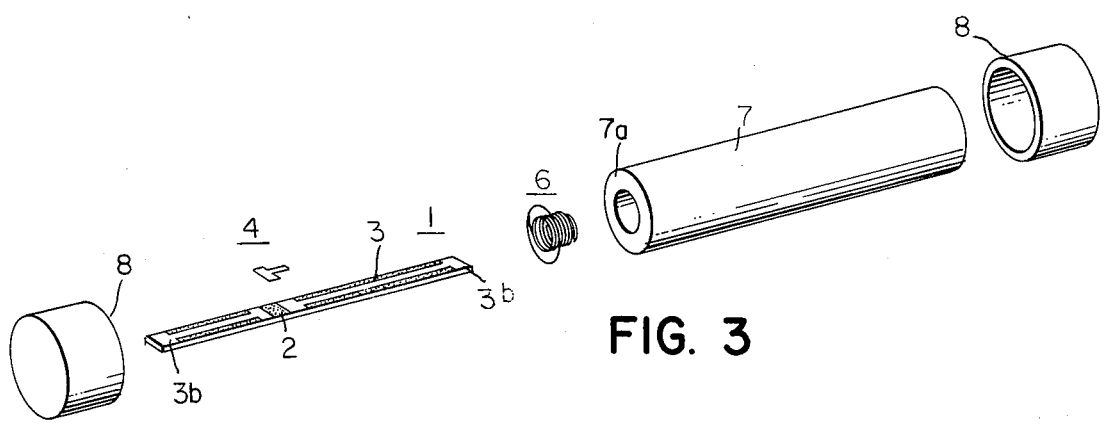
FIG. 3 is an exploded isometric view of a fuse embodying the present invention.

FIG. 1b shows the variable diameter extension spring 6 used to bias bridge member 4. Spring 6 includes a portion 6a where its diameter is smallest, a portion 6b of intermediate diameter and a portion 6c where its diameter is largest and larger than the inner diameter of casing 7. The two arms 4a of bridge or shorting member 4 are arranged between spring portions 6a and 6b. Hence spring 6 exerts a pull from right to left, as seen in FIG. 3. The left wide end of spring 6 rests against the end surface 7a of tube 7.

In the embodiment shown in FIG. 3 tube 7 forms the casing of the fuse, housing strip 1, bridge member 4 and spring 6. Caps or ferrules 8 are mounted on the end of casing 7. The axially outer ends 3b of strips 3 are soldered by so-called blind solder joints to caps 8, as shown in greater detail in my above referred-to patent application.

Tube 7 may not be used as casing of the fuse but merely as abutment member for spring 6. In this case tube 7 is inserted into a tube having a larger inner diameter than the outer diameter of tube 7 and the ferrules or caps 8 are mounted on that tube and conductively connected to the axially outer ends 3b of overlays 3.

I claim as my invention:

1. An electric fuse including
   a. an elongated partially metal clad strip of electric insulating material, said strip having a center area from which the metal overlay is entirely removed to form an insulting gap;
   b. a bridge member extending across said insulating gap and conductively interconnecting portions of said metal overlay left on said strip;
   c. a pair of soft solder joints effecting said conductive interconnection;
   d. said bridge member having a pair of arms projecting beyond said elongated metal clad strip;
   e. a helical extension spring having a relatively small diameter at one end and a relatively large diameter at the other end thereof, said one end of said spring being affixed to said arms of said bridge member; and
   e. a tubular member of insulating material supporting said large diameter end of said spring.

2. An electric fuse as specified in claim 1 wherein said elongated member has two substantially I-shaped metal overlays each to opposite sides of said insulating-gap-forming area thereof, the portions of said overlay immediately adjacent said insulating-gap-forming area contributing to the time lag of the fuse and the portions of said overlay at the axially outer ends of said strip forming connector tabs.

3. An electric fuse as specified in claim 1 wherein said bridge-member is T-shaped, the center portion of said bridge member bridging said insulating gap and the transverse arms of said bridge-member providing abutments for the small diameter end of said spring.

4. An electric fuse including
   a. a tubular member of electric insulating material having a predetermined inner diameter;
   b. an elongated insulating substrate inside said casing;
   c. metallic overlays on said insulating substrate leaving a center zone uncovered so as to form an insulating gap;

d. the portions of said metallic overlays immediately adjacent said insulating gap being enlarged substantially to the gap width to provide heat absorbing means and the portions of said metallic overlays further remote from said insulating gap being of reduced width relative said first mentioned portions of said metallic overlays;

e. a substantially T-shaped bridge member having a center portion bridging said insulating gap and having lateral arms projecting beyond said strip;

f. two soft solder joints conductively connecting said bridge member and said metallic overlays; and g. a substantially helical extension spring having a relatively small diameter on one end thereof and having a relatively large diameter exceeding said inner diameter of said tubular member at the other end thereof, said extension spring being affixed with the small diameter ends thereof to said lateral arms of said bridge member and said extension spring resting with the large diameter end thereof against said tubular member.

* * * * *